(12) United States Patent
Saila

(10) Patent No.: US 9,766,729 B2
(45) Date of Patent: Sep. 19, 2017

(54) ACCESSORY FOR AN ELECTRONIC DEVICE

(71) Applicant: Nokia Corporation, Espoo (FI)

(72) Inventor: Sami Ilmari Saila, Halikko (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/057,711

(22) Filed: Oct. 18, 2013

(65) Prior Publication Data

US 2014/0176461 A1 Jun. 26, 2014

(30) Foreign Application Priority Data

Oct. 19, 2012 (EP) .................................... 12189187

(51) Int. Cl.
*G06F 3/041* (2006.01)
*G06F 3/0354* (2013.01)

(52) U.S. Cl.
CPC .......... *G06F 3/041* (2013.01); *G06F 3/03545* (2013.01); *G06F 2200/1632* (2013.01)

(58) Field of Classification Search
CPC .......... G06F 21/36; G06F 21/32; G06F 21/45; G06F 3/016; G06F 3/0416
USPC ......... 345/173–179; 178/18.01–18.11, 19.01
See application file for complete search history.

(56) References Cited

U.S. PATENT DOCUMENTS

| | | | | |
|---|---|---|---|---|
| 5,756,941 A | * | 5/1998 | Snell | 178/19.01 |
| 6,149,621 A | * | 11/2000 | Makihara | 604/27 |
| 7,050,041 B1 | * | 5/2006 | Smith | G06F 3/0312 |
| | | | | 345/156 |
| 2006/0049579 A1 | * | 3/2006 | Miyamoto et al. | 273/148 B |
| 2007/0216664 A1 | | 9/2007 | Marye | |
| 2008/0055237 A1 | | 3/2008 | Kim et al. | |
| 2008/0150378 A1 | * | 6/2008 | Heinrich | H02K 7/1853 |
| | | | | 310/78 |
| 2009/0050377 A1 | | 2/2009 | Lee | |
| 2009/0187069 A1 | * | 7/2009 | Terliuc | A61B 1/0055 |
| | | | | 600/106 |

FOREIGN PATENT DOCUMENTS

EP 1637981 A2 3/2006
WO 2006/107072 A1 10/2006

OTHER PUBLICATIONS

Extended European Search Report received for corresponding European Patent Application No. 12189187.3, dated Mar. 1, 2013, 9 pages.

* cited by examiner

*Primary Examiner* — Kent Chang
*Assistant Examiner* — Scott Au
(74) *Attorney, Agent, or Firm* — Harrington & Smith

(57) ABSTRACT

An accessory comprising an interface configured to control an electronic device into which the input device is configure to be connected, the electronic device comprising a display, wherein the interface is configured to control the electronic device in response to movement of the input element across a surface of the electronic device for controlling the electronic device.

18 Claims, 4 Drawing Sheets

ACCESSORY FOR AN ELECTRONIC DEVICE

TECHNICAL FIELD

The present application relates generally to an input device for an electronic device.

BACKGROUND

Input devices may be provided for electronic devices for different purposes. One purpose may be to provide additional functionality for the electronic device. Another purpose may be to provide improved user experience for controlling the electronic device in different use cases. Yet another purpose may be to provide an input device that is configured to be removably connected to the electronic device.

SUMMARY

Various aspects of examples of the invention are set out in the claims. According to a first aspect of the present invention there is an
  input device comprising
    an interface configured to control an electronic device into which the input device is configure to be connected, the electronic device comprising a surface,
    wherein the interface is configured to control the electronic device in response to movement of the input device across a the surface of the electronic device for controlling the electronic device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
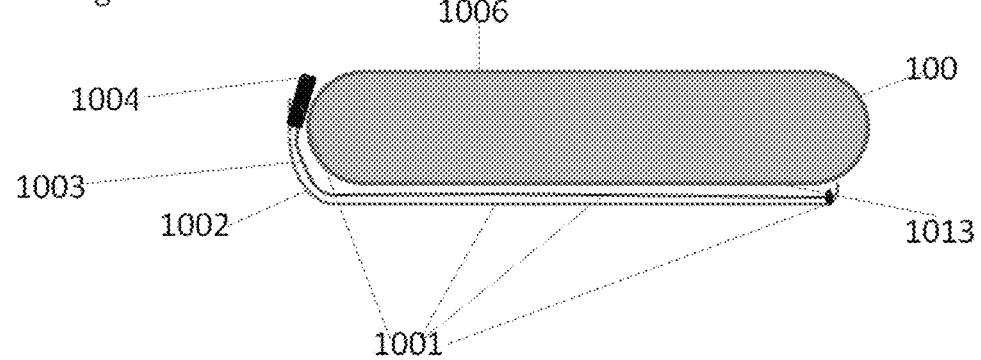
FIG. 1 presents an example embodiment of the invention, in which an electronic device and an input device is illustrated.

FIG. 1 is an example embodiment of an electronic device 100 according to the invention. The electronic device 100 comprises an input device 1001 configured to be connected on a surface of the electronic device 100. The input device 1001 comprises an interface which is configured to control the electronic device 100, the interface may be at least one of a mechanical interface or an electronic interface. The input device 1001 comprises a substantially elongated element 1002 which is according to this example embodiment attached to the back surface 1013 of the electronic device 100. According to another example embodiment, the input device 1001 is configured to be attached to a front surface of the electronic device 100. The elongated element 1002 is configured to house an elastic band 1003. The elongated element 1002 is configured to form an elongated housing for storing at least part of the input device 1001. The elongated element 1002 may be made of metal. The elongated element 1002 may be made of plastic. The elastic band 1003 has one end configured to be attached to a corresponding end of the elongated element 1002. The elastic band 1003 may be made from an elastic material, for example rubber. The elastic band 1003 may be retractable to and retractable from the elongated element. The input device 1001 comprises an input member 1004 resiliently attached to the elongated element 1002. According to an example embodiment the input member 1004 may extend over the front surface of the device 100 until the back surface as well. According to this example embodiment, the device 100 may comprise touch surface along the devices 100 back side and the user is able to control the device 100 also from the back by using the input member 1004. The elastic band 1003 has another end configured to be attached to an input member 1004. The elastic band 1003 may be a mechanical band with no intelligence. According to another example, the elastic band 1003 may be configured to pass electric current and/or data. The input member 1004 may be made from an elastic material, for example rubber. The input member 1004 may comprise a pressure sensor. The input member 1004 may be made from a rigid material, for example plastic. The elongated element 1002 is configured to house the elastic band 1003 in that the elongated element 1002 may be a hollow tube like element. The elongated element 1002 is configured to house the elastic band 1003 in that the elongated element 1002 may be a tunnel comprising an open side. The elongated element 1002 may be a collapsible tube. By flattening the collapsible tube, with a finger for example, the user may be able to control the movement of the input member 1004 on the surface of the electronic device 100. By flattening the collapsible tube, with a finger for example, the user may be able to stop the movement of the input member 1004 on the surface of the electronic device 100. By flattening the collapsible tube, with a finger for example, the user may be able to get a haptic feedback corresponding the amount of control she/he has over the input member 1004. By flattening the collapsible tube, with a finger for example, the user may be able to slow down the movement of the input member 1004. The elongated element 1002 may be configured to extend a distance further from an edge of the electronic device 100 on which the elongated element 1002 is configured to be connected to. The distance may be configured to be suitable for providing a recess for the input member 1004. The input member 1004 may be housed in the recess while not in use. According to another example embodiment, the elastic band 1003 into which the input member 1004 is configured to be attached may be configured to be pulled out from the elongated element 1002 with a finger of a user and released back to the mounting when not in use. According to an example embodiment, the input device 1001 is resiliently extendable relative to a display 1006 that is part of the surface of the electronic device 100. According to an example embodiment, the elongated element 1002 may extend over an edge of the electronic device 100 until it substantially reaches a display 1006 of the electronic device 100. In this example embodiment, there is no recess 1014 provided either in the space between the elongated element 1002 and the electronic device 100 or along the surface of the accessory cover. Instead, the input member 1004 is configured to be retracted into the elongated element 1002 when not in use and configured to be released from the elongated element 1002 when taken into use. When the input member 1004 is configured to be retracted into the elongated element 1002 the input member 1004 is configured to be housed in the elongated element 1002 is such a way that the input member 1004 is visible and configured to be grabbed by a finger of the user when taken into use.

The electronic device 100 may comprise an accessory cover 1010. The accessory cover 1010 is configured to house the input device 1001. According to this example embodiment, there may be a cavity provided as a recess 1014 for the input member 1004. The input member 1004 may be housed in the recess 1014 while not in use.

Figure 2:
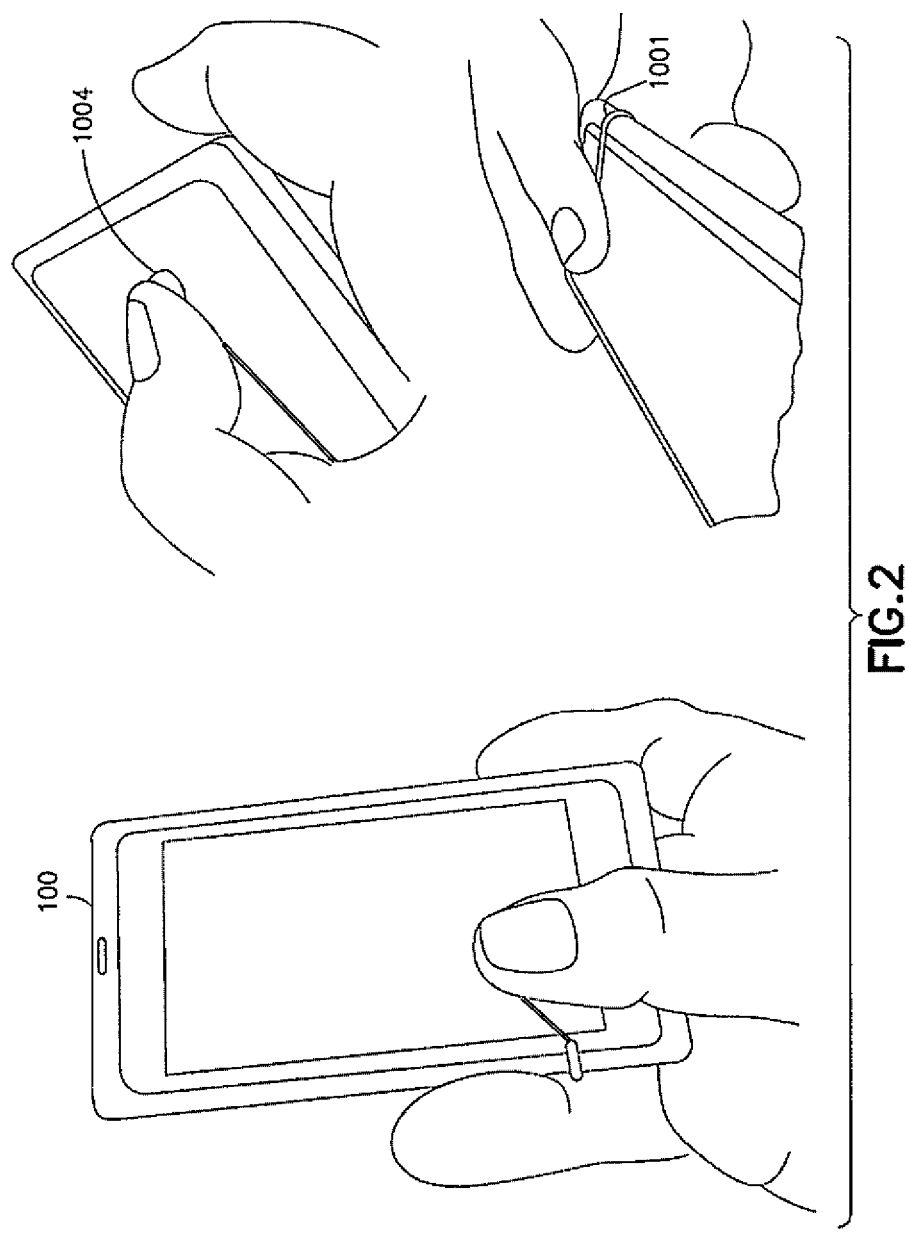
FIG. 2 presents an example embodiment of the invention, in which an electronic device is being controlled by the input device.

FIG. 2 is an example embodiment of an electronic device 100 according to the invention. According to this example embodiment, a user may control the electronic device 100 by using the input member 1004. According to this example embodiment the input device 1001 is provided on an edge of the electronic device 100. However, the user may be able to change the place of the input device 1001 along the edges of the electronic device 100. According to this example embodiment, the user may hold the electronic device 100 on one hand and use the input member 1004 on the surface of the electronic device 100.

Figure 3:
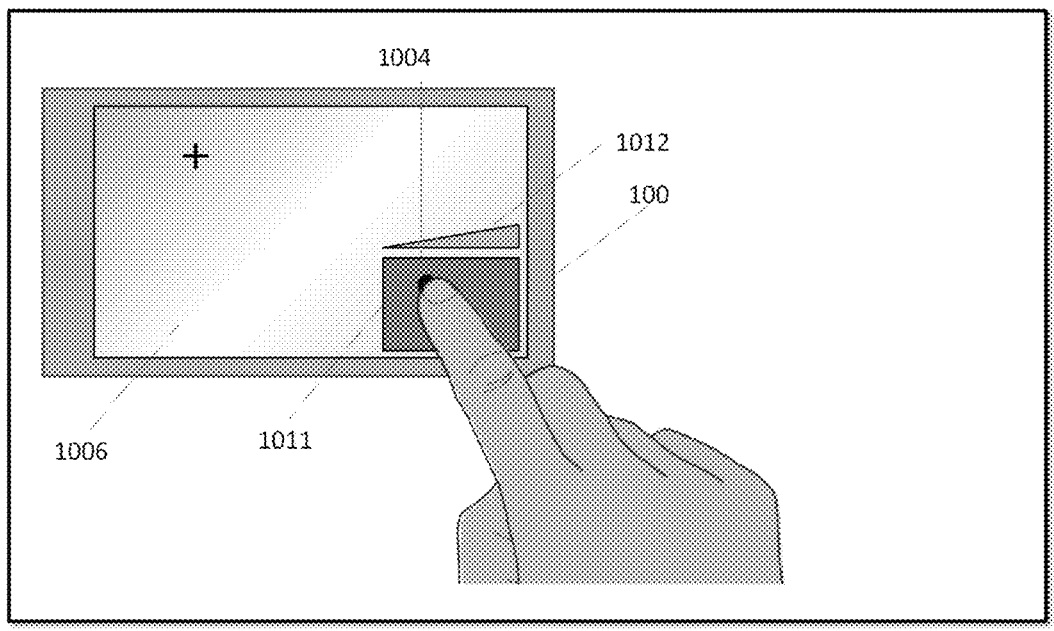
FIG. 3 presents an example embodiment of the invention, in which an electronic device is being controlled by the input device.

FIG. 3 is an example embodiment of an electronic device 100 according to the invention. The input member 1004 is provided on the surface of the electronic device 100 and a user may control the electronic device 100. According to this example embodiment, an image 1011 is provided at one of the corners of the display 1006. According to this example embodiment the image 1011 is a track pad area. The element 1011 is provided as a specific area shown on the surface of the display 1006 along which the input member 1004 may be able to control information shown on the display 1006. According to this example embodiment, an image 1012 is provided substantially next of the image 1011. The image 1012 is a sensitivity bar. The image 1012 is provided on the display 1006 as a specific area along which the user may be able to control the amount of movement which the input member 1004 on the element 1011 has according to a current use case. For example, the user may be doing a task with her/his electronic device 100 which requires only a relatively small movement of the input member 1004 for example coloring a detail in a drawing. In this example use case, the user may adjust the movement of the input member 1004 to the smallest possible along the sensitivity bar 1012. According to another example, the user may be doing a task with her/his electronic device 100 which requires a relatively large movement of the input member 1004, for example drawing a line extending the full length of the display 1006 of the electronic device 100. In this example use case, the user may adjust the movement of the input member 1004 to the largest possible along the sensitivity bar 1012. According one example of the input, the user is able to adjust both the absolute movement of the input member 1004 and a relative movement of the input member 1004 by touching the sensitivity bar 1012 on the display 1006 of the electronic device 100. According to another example of the invention, the user is able to adjust both the absolute movement of the input member 1004 and a relative movement of the input member 1004 by hovering over the sensitivity bar 1012. According to another example of the invention, the user is able to adjust both the absolute movement of the input member 1004 and a relative movement of the input member 1004 by sliding her/ his finger over the sensitivity bar 1012 on the display 1006 to preferred direction. The sensitivity bar 1012 according to FIG. 3 is one example of the physical form the image of the sensitivity bar 1012 may have, and other suitable physical forms are possible as well. The absolute movement refers to the actual movement of the input member on the display 1006 in that for example the user is drawing a line by using the input device 1001, over the full length of the display 1006. User may therefore move the input device 1001 over the full length of the display 1006. The relative movement refers to the amount of movement of the input member 1004 on the display 1006 in that for example the user is drawing a line by using the input device 1001, and the line should follow the full length of the display 1006. User may therefor move the input device 1001 only over a part of the full length of the display 1006.

Figure 4:
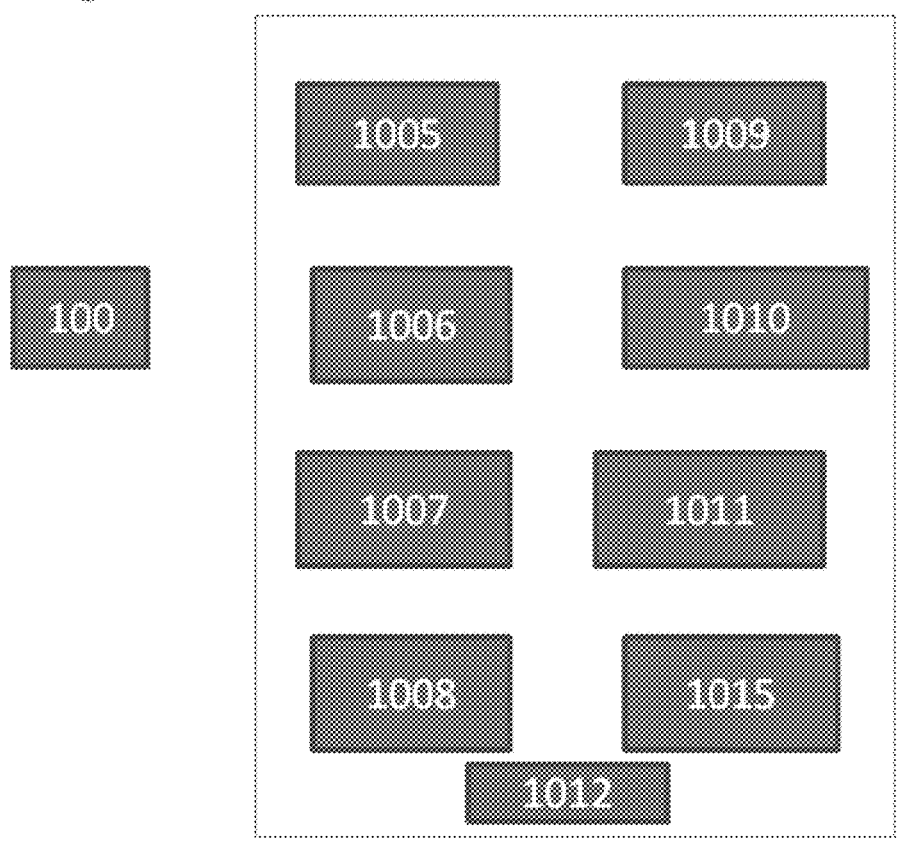
FIG. 4 presents an example embodiment of the invention, in which an electronic device is described in a flow chart.

FIG. 4 is an example embodiment of an electronic device 100 according to the invention. The electronic device 100 comprises a PWB 1005 configured to support different components of the electronic device 100. The electronic device 100 comprises a display 1006 configured to show information to a user of the electronic device 100. A display 1006 may provide an output, in input and/or at least part of a user interface. The display 1006 may be configured to show information about functionality of the electronic device 100 to a user. The display 1006 may be configured to show an application running in the electronic device 100. The display 1006 may be for example but not limited to a touch display with resistive or capacitive or inductive features or an electronic ink display or a liquid crystal display LCD. The electronic device 100 comprises input 1007 configured to provide a user of the electronic device 100 a means of inputting characters and/ or numbers into the electronic device 100. The input 1007 may be for example but not limited to a mechanical key or mechanical keys, a joystick, a navigation key, a scroll key or a touch display element. The input 1007 may be capacitive input, an inductive input, a resistive input. The electronic device 100 comprises a power source 1008 configured to provide power to the electronic device 100. The power source 1008 may be for example but not limited to a solar cell battery or a li-ion battery. The electronic device 100 comprises a transceiver 1009. The transceiver of an electronic device 100 may comprise for example an antenna/transmitter/ receiver 1009, configured to provide connection to a network. The transceiver may transmit and receive e.g. radio frequency (RF) signals to/from external network and/or device. The network may comprise code division multiple access (CDMA), wideband code division multiple access (WCDMA), 3rd generation (3G), 4th generation (4G), global system for mobile communications (GSM), wireless local area network (WLAN). The electronic device 100 may comprise logic/ control/memory 1010 configured to store, organize and process information. The logic/control/memory block 1010 may at least partly control internal data, operations and/or functions of the electronic device 100. A processor 1011 is configured to process information. The processor 1011 may execute instructions and enable operation of the electronic device 100. A speaker 1012 is configured to convert audio signals into sound, and a microphone 1015 is configured to receive for example pressure waves of a sound, and convert the pressure waves into electrical signals.

The electronic device 100 may be at least one of the following; a mobile/cellular phone, a lap top computer, an internet tablet, a MP3/music player, a gaming device, a personal digital assistant. Although various aspects of the invention are set out in the independent claims, other aspects of the invention comprise other combinations of features from the described embodiments and/or the dependent claims with the features of the independent claims, and not solely the combinations explicitly set out in the claims.

According to at least one of the example embodiments of the invention, one of the advantages of an example embodiment may be to provide a pocket-sized accessory input device for an electronic device. According to another example embodiment, one of the advantages may be to provide a convenient sized accessory input device which doesn't block the display of the electronic device. According to another example embodiment, one of the advantages may be to provide an accessory input device which is configured to be removably connected to an electronic device. According to another example embodiment, one of the advantages may be to provide an accessory input device which may be connected to an electronic device of which surface is inclined. According to another example embodiment, one of the advantages may be to provide an accessory input device of which input member can be retracted away from the display of the electronic device, when the input member is not in use. According to another example embodiment, one of the advantages may be to provide an accessory input device which is light weight. According to another example embodiment, one of the advantages may be to provide an accessory input device which is easy to use with one finger while holding the electronic device in both hands. According to another example embodiment, one of the advantages may be to provide an accessory input device which is easy to use with one finger while holding the electronic device in one hand. According to another example embodiment, one of the advantages may be to provide an accessory input device which is easy to use while the electronic device is on a flat surface. According to another example embodiment, one of the advantages may be to provide an accessory input device which is configured to be attached to an user engageable cover and the cover is affixed to the surface of the electronic device. The user engageable cover may provide a convenient way to control the electronic device. The user engageable cover may provide protection for the electronic device. According to another example embodiment, one of the advantages may be to provide an accessory input device which comprises an additional input member which is configured to be connected to the electronic device. According to another example embodiment, one of the advantages may be to provide an accessory input device of which input member is capable of reaching each corner of the display of the electronic device. According to another example embodiment, one of the advantages may be to provide an accessory input device which comprises an additional input member which is configured to be connected to the electronic device along the surface of the electronic device and the user is capable of choosing most convenient place along the surface of the electronic device. According to another example embodiment, one of the advantages may be to provide an accessory input device which improves gaming experience while the user is playing games with his/her electronic device. The gaming experience may be improved especially in games in which a game figure is configured to be controlled by the user. According to another example embodiment, one of the advantages may be to provide an accessory input device which improves writing experience when the user is writing text and/or message. According to another example embodiment, one of the advantages may be to provide an accessory input device which improves zooming experience when the user is zooming on a location of a map application. According to another example embodiment, one of the advantages may be to provide an accessory input device which improves selection experience when the user is browsing the internet and chooses a web page of his/her interest. According to another example embodiment, one of the advantages may be to provide an accessory input device which improves drawing experience when the user is drawing an image on the surface of the electronic device. According to another example embodiment, one of the advantages may be to provide an accessory input device which may be used when the electronic device is in a portrait position and when the electronic device is a landscape position.

It is also noted herein that while the above describes example embodiments of the invention, these descriptions should not be viewed in a limiting sense. Rather, there are several variations and modifications which may be made without departing from the scope of the present invention as defined in the appended claims.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An input device comprising an interface configured to control an electronic device into which the input device is configure to be connected, the electronic device comprising a surface, wherein the interface is configured to control the electronic device in response to movement of the input device across the surface of the electronic device for controlling the electronic device, wherein the input device comprises an elongated element, wherein the elongated element is a collapsible tube configured to be flattened by a user for providing haptic feedback, wherein the elongated element is configured to be attached to an exterior surface of the electronic device, wherein the input device is configured to provide haptic feedback at the collapsible tube when the input device is moved across a display surface of the electronic device, and wherein the elongated element is configured to form an elongated housing for storing at least part of the input device.

2. An input device according to claim 1, wherein the interface is at least one of the following; a mechanical interface or electronic interface.

3. An input device according to claim 1, wherein the input device is resiliently extendable relative to a display that is part of the surface of the electronic device.

4. An input device according to claim 1, wherein the haptic feedback is provided between the user's finger and a display of the electronic device.

5. An input device according to claim 4, wherein the input device comprises an input member resiliently attached to the elongate housing.

6. An input device according to claim 5, wherein the input member is configured to be pulled out from the elongated element with a finger of a user.

7. An input device according to claim 5, wherein the input member is configured to provide input for the electronic device when the input member is extended from the elongated element over the surface of the electronic device.

8. An input device according to claim 5 wherein the input member is configured to provide input for the electronic device when the input member is extended from the elongated element over the display.

9. An input device according to claim 5, wherein the input member is configured to interface with the electronic device using at least one of the following; a capacitive input, an inductive input, a resistive input.

10. An input device according to claim 5 wherein the elongated element comprises any one of a plastic tube, metal tube or a rubber tube.

11. An input device according to claim 1, wherein the input device is configured to interface with the electronic device using at least one of the following; a capacitive input, an inductive input, a resistive input.

12. A user engageable cover comprising the input device according to claim 1.

13. A user engageable cover comprising the input device according to claim 1 wherein the cover is affixed to the surface of the electronic device.

14. A portable electronic device comprising the input device according to claim 1.

15. A portable electronic device comprising the user engageable cover according to claim 12.

16. An input device according to claim 1, wherein movement of the input member is configured to be controlled when the collapsible tube is flattened by the user.

17. An input device according to claim 1, wherein movement of the input member is configured to be stopped when the collapsible tube is flattened by the user.

18. An input device according to claim 1, wherein the haptic feedback corresponds to an amount of control a user has over the elongated element.

* * * * *